Oct. 21, 1941.          C. SURICO                    2,259,963
                    DOUGH PRODUCT DRIER
                    Filed Nov. 17, 1937          3 Sheets-Sheet 1
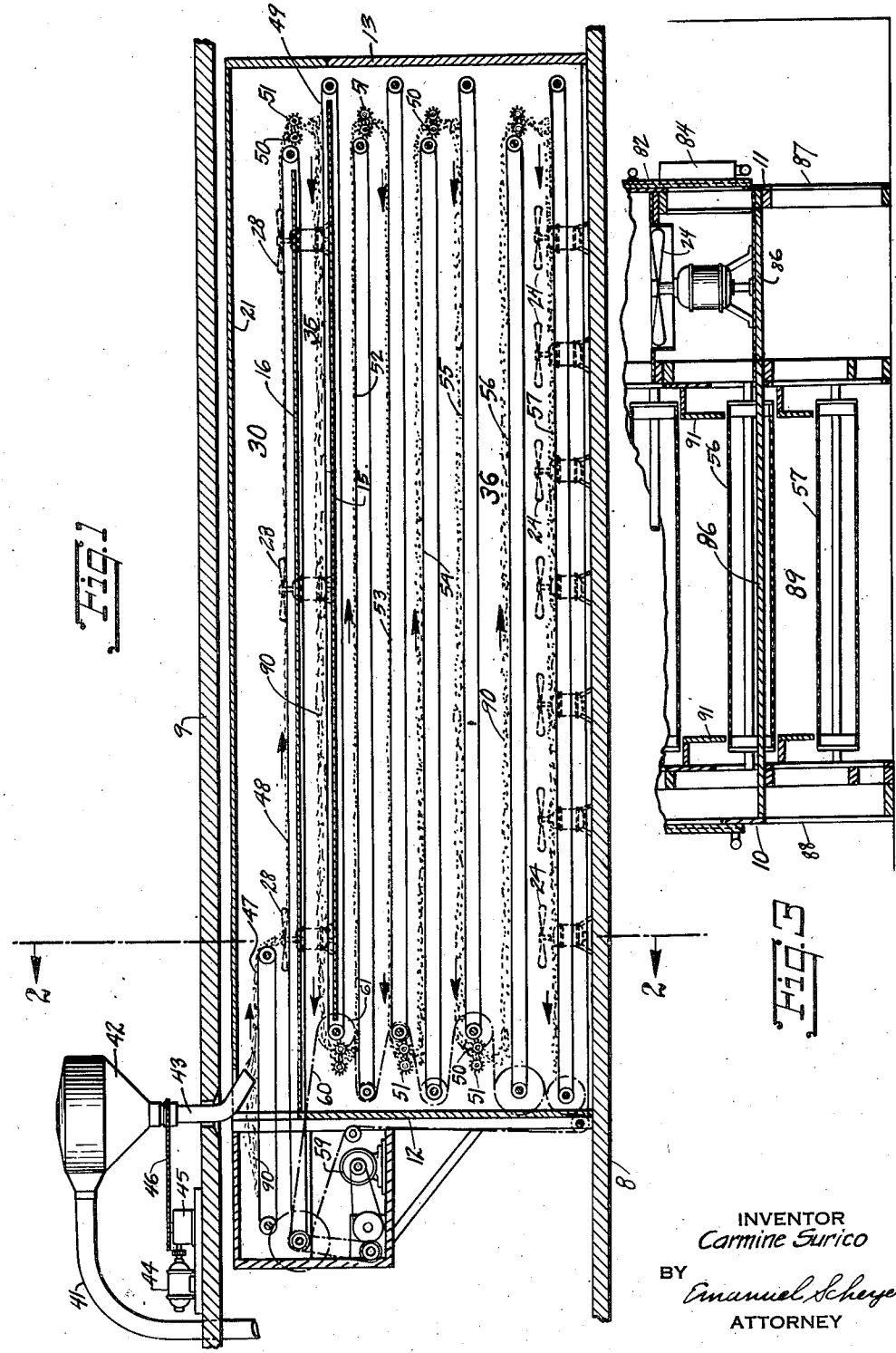
INVENTOR
Carmine Surico
BY
Emanuel Scheyer
ATTORNEY

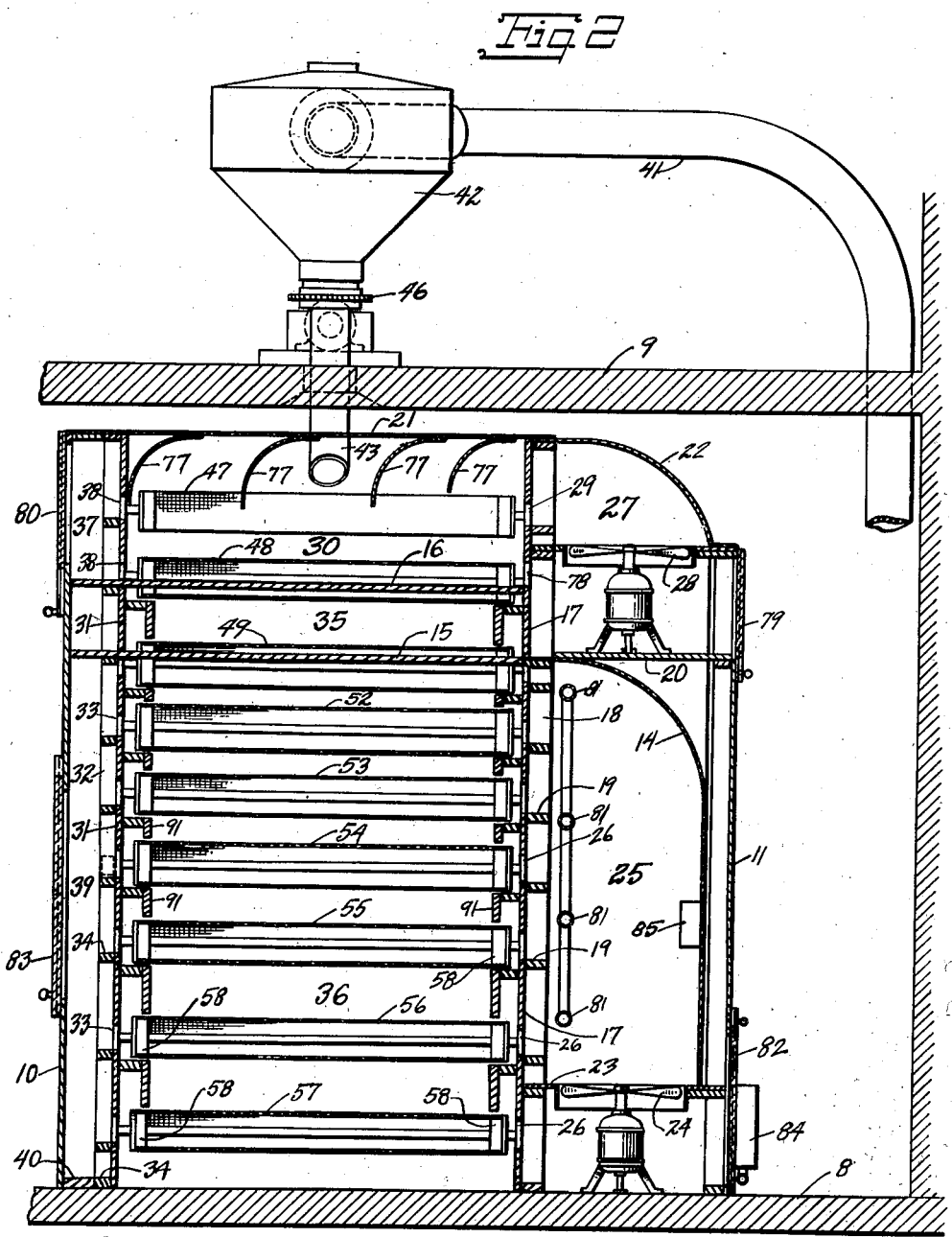

Oct. 21, 1941.  C. SURICO  2,259,963
DOUGH PRODUCT DRIER
Filed Nov. 17, 1937  3 Sheets-Sheet 3
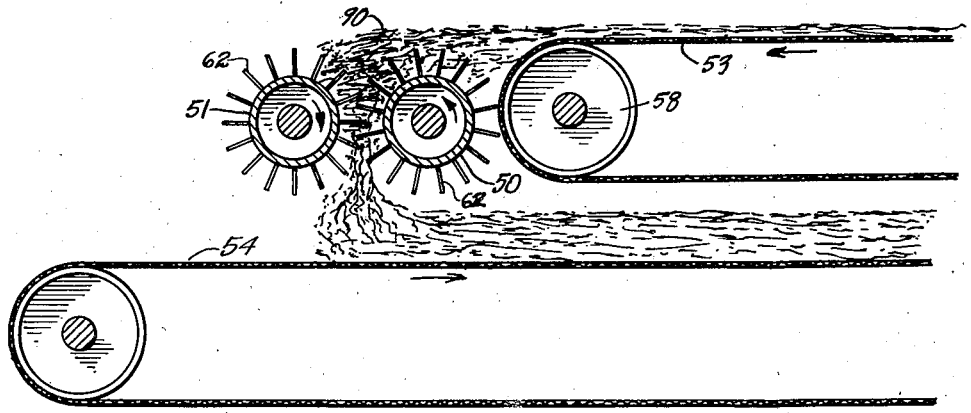
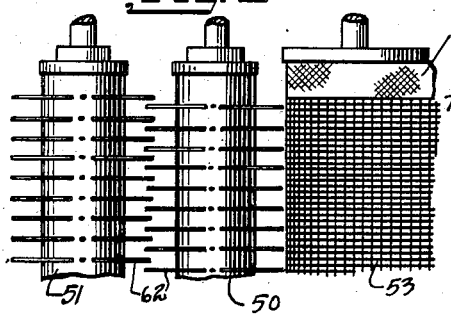
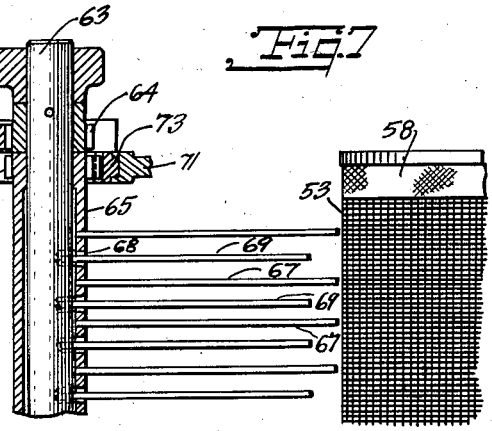
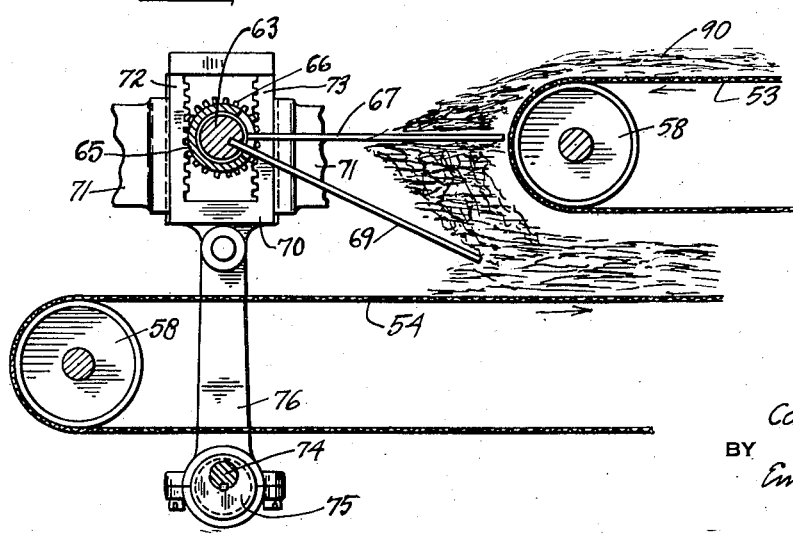
INVENTOR
Carmine Surico
BY
Emanuel Scheyer
ATTORNEY Patented Oct. 21, 1941

2,259,963

UNITED STATES PATENT OFFICE 2,259,963

DOUGH PRODUCT DRIER

Carmine Surico, New York, N. Y.

Application November 17, 1937, Serial No. 174,968

3 Claims. (Cl. 34—203)

This invention relates to improvements in the drying of dough products such as noodles and macaroni both long and short cut.

It has for an object the provision of means and apparatus to effect the drying of the dough product without subjecting it to deterioration in color, texture and shape. A preliminary or quick drying chamber is provided to take off the excess moisture, drying the product at its surface and stiffening it there to help it keep its shape and color during the rest of the drying process. Then to prevent imprisoning the moisture in the interior of the product in a hard dry shell, the product is sent through a sweating chamber, to allow the interior moisture to creep out to the surface. The product is then sent through a final drying chamber, where it is evenly and uniformly dried. The product, while in the drying chambers, is subject to air currents. In the final drying or curing chamber, controlled heat and moisture is introduced to bring the product to its desired final condition. The product passes through the several chambers on endless belt conveyers, which have their runs made of wire mesh to permit circulation of air through the runs and the product resting on them. In the final drying chamber, particularly, the air is introduced into the interior of the conveyer, that is, between its upper and lower runs and flows generally laterally through the chamber into an air return chamber at the rear from whence it is brought by the suction of a blower to the front of the former chamber for its further circulation through it. The air return chamber ensures proper circulation of the air at the end of the chamber away from the blower.

Another object of the invention is the provision of agitating means at the ends of the conveyers, so that as the product passes down from one conveyer to the next, any lumping that may have occurred is broken up.

Other objects and advantages will become apparent upon further study of the specification and drawings, in which:

Fig. 1 is a longitudinal section of the machine looking toward its front, that is toward the side where the blowers are located.

Fig. 2 is a cross section taken along the line 2—2 of Fig. 1, the macaroni being omitted from the conveyers.

Fig. 3 is a partial cross section taken similarly to Fig. 2, but showing an alternate type having a lower cooling compartment.

Fig. 4 is a partial longitudinal section, to an enlarged scale, at the end of two succeeding conveyers showing the agitating rollers.

Fig. 5 is a partial plan looking down on the top conveyer and agitating rollers of Fig. 4.

Fig. 6 is a partial longitudinal section taken similarly to Fig. 4, but showing an alternate type of agitator, and Fig. 7 is a partial plan and section looking down on the top conveyer and cutting through the agitating device.

The drier which occupies substantially the full space between the floors 8 and 9 of a building, comprises a front wall 11, a rear wall 10, Fig. 2, and end walls 12 and 13, Fig. 1.

Set inside of wall 11, Fig. 2, is a sheet metal lining 14. The upper end of lining 14 curves forward to join a horizontal partition 15 which extends across to rear wall 10 and for substantially the length of the drier, Fig. 1. At a space above partition 15 is another similar partition 16. These partitions extend from rear wall 10 across to an inner front wall 17. A series of uprights, one of which is shown at 18, are located in spaced positions along the length of wall 17 for bracing same. Horizontal boards 19 extend between uprights 18.

Located above the top of sheet metal lining 14 and about on a line with partition 15 is a shelf 20. Above shelf 20, and extending over from the top of wall 11 to the top of wall 17, on a line with top wall 21 of the drier, is a sheet metal wall 22, which runs for the length of the drier.

At the bottom of lining 14 is a shelf 23 extending between walls 11 and 17. Set on floor 8, below shelf 23, are blowers 24, which send the air through openings in shelf 23 into a flue 25 defined by lining 14 and inner front wall 17. The air from flue 25 passes into the interior of the drier through openings 26 provided in wall 17. Another flue 27, defined by walls 22 and 17 is located above flue 25. Blowers 28 send the air through flue 27 through opening 29 into the interior of the drier above partition 10. Top wall 21 is provided with curved baffles 77 for downwardly deflecting the air entering preliminary drying chamber 30 through opening 29. Preliminary drying chamber 30 is defined by partition 16, the upper portion of front inner wall 17, top wall 21 and the upper portion of rear inner wall 31, said latter wall being similar in construction to wall 17, having uprights 32, openings 33 and 36, and horizontal boards 34. Beneath chamber 30 is sweating or dead air chamber 35 which is defined by lower partition 15, upper partition 16, front inner wall 17 and rear inner wall 31. There are no openings in either wall 17 or wall 31 leading into sweating chamber 35. Beneath sweating chamber 35 is the final drying chamber 36, which is defined by partition 15, front and rear inner walls 17 and 31 and floor 8. Openings 38 lead from preliminary drying chamber 30 into upper air return chamber 37 which is defined by top wall 21, rear wall 10, rear inner wall 31 and partition 16. Openings 33 lead from final drying chamber 36 into lower air return chamber 39 which is defined by partition 15 rear wall 10, bottom boards 34 and 40 and rear inner wall 31.

A conduit 41 delivers the product to be treated to a hopper 42. Rotatably mounted on the bottom of hopper 42, is curved chute 43. Motor 44 through reducing gear box 45 and chain 46 effects the rotation of chute 43. As the product 90 is discharged from chute 43, the rotation of the latter distributes it about on delivery conveyer 47 which moves in the direction indicated by the arrow. Conveyer 47 travels very fast delivering the product on slower moving conveyer 48. The upper run of conveyer 48 travels through preliminary drying chamber 30. The product carried by conveyer 48 is discharged at its right hand end upon conveyer 49, whose upper run passes through dead air chamber 35. Conveyer 49 runs much slower than conveyer 48, so that the product is piled up thickly upon the former. In passing from conveyer 48 to conveyer 49, the product passes between agitator rolls 50 and 51 which break up any lumping together or agglomeration of the product, it being remembered that the product is soft, moist and sticky before drying. Rolls 50 and 51 will be described in more detail later on.

The product is discharged from conveyer 49 to conveyer 52, passing from the latter successively to conveyers 53, 54, 55, 56 and 57. Conveyers 52 to 57 are in the final drying chamber 36. The product passes out of the drier from conveyer 57. In passing from one conveyer to the next, the product passes between agitator rolls 50 and 51. The conveyers pass over rolls 58 which are mounted in suitable bearings at inner front and rear walls 17 and 31. As the product is carried along the top runs of the conveyers, it is kept from falling off the sides of said runs by longitudinal stationary guides 91 fixed to front and rear inner walls 17 and 31. The conveyers are driven by motor 59 through chains or belts 60 engaging wheels 61 mounted on the left hand rollers 58 (Fig. 1). The conveyer runs are of wire mesh to allow of a free circulation of air through them.

Agitator rolls 50 and 51, Figs. 1, 4 and 5 are driven by gearing (not shown) from rolls 58, roll 50 being preferably rotated at about 60 R. P. M. while roll 51 is rotated in the opposite direction at about one-third R. P. M. Each roll is thickly studded with radially extending pins 62. As the product is sent off the end of a conveyer, say conveyer 53, pins 62 on roll 50 quickly pull it apart and throw it mostly against pins 62 on roll 51. The portion of the product impaled on pins 62 of slowly rotating roll 51 is held back from that engaged by pins 62 of rapidly rotating roll 50 very effectively separating any lumps or agglomerated masses of the product. As roll 51 is slowly rotated, it presents fresh pins to the oncoming mass, moving away others that may have become clogged. The action of agitator rolls 50 and 51 is especially adapted for long noodles or other string dough products that have a tendency to tangle. While the use of roll 51 is preferred, it may be omitted, relying solely on the separating action of pins 62 on roll 50.

An alternate form of agitator is shown in Figs. 6 and 7. At the discharge end of a conveyer, say conveyer 53, is mounted a shaft 63 which has gear 64 fixed to it near its end. Rotatably mounted on shaft 63 is a sleeve 65 having a gear 66 fixed to it near its end and adjacent to gear 64. Sleeve 65 has a horizontally extending row of radially extending pins 67. Alternating with pins 67, sleeve 65 has slots 68. Shaft 63 carries radially extending pins 69 which pass through slots 68. A head 70 is mounted to slide between fixed guides 71. Head 70 carries a rack arm 72 meshing with gear 64 and a rack arm 73 meshing with gear 66. A shaft 74, driven by gearing, not shown, from a roller 58, has an eccentric 75 fixed to it. Engaging eccentric 75 is a pitman 76 pivotally connected to head 70. The rotation of shaft 74 causes head 70 with its rack arms 72 and 73 to reciprocate up and down, rocking gears 64 and 66 in directions opposite to each other. This causes shaft 63 to raise pins 69 while sleeve 65 lowers pins 67 and vice versa. Pins 69 raise to the position of pins 67 and then return to the position shown for them in Fig. 6. At the same time pins 67 turn down to the position of pins 69 and then return to the position shown for them in Fig. 6. The passing of the row of pins 69 between the row of pins 67 agitates and separates the oncoming product 90 on its way from the discharge end of the upper conveyer to the receiving end of the lower conveyer.

In the preliminary drying chamber 30, the product is subjected to a quick drying action which might be said to case-harden the product, that is an outer dryer and firmer layer is formed on the noodles or macaroni or other dough product while the interior remains soft and moist. This prevents the product from checking and losing its shape and color. Blowers 28 send the air through flue 27, through opening 29 into preliminary drying chamber 30 where baffles 77 throw it downward in cross currents against the main flow of air from openings 29 transversely through the chamber. In general the air passes from openings 29 through chamber 30 above the product being carried by conveyer 48, out upper openings 38 into air return chamber 37, back through lower openings 38 into chamber 30 and out openings 78 into the suction end of flue 27. At the same time a considerable flow of air goes past the product on conveyer 48, through the meshes in the conveyer and out openings 78. In order to control the moisture content of the air in chambers 30 and 37 and flue 27, vertically sliding doors 79 are provided in wall 11 opposite flue 27 and vertically sliding doors 80 are provided in wall 10 of air return chamber 37. The amount these doors are opened will control the amount of fresh air taken into the circulation of air through chamber 30. The size of openings 29, 38 and 78 are relatively small compared to the power of blower 28, so that the air is under pressure and there is not so much a large quantity of air flowing directly through chamber 30 as there is of churning, eddying and swirling of the air past the product.

In order to ensure an even drying of the product and to prevent its cracking or checking and loss of color, sweat or dead air chamber 35 is provided. The product passes from conveyer 48 to conveyer 49, which moves much slower than conveyer 48, causing the product 90 to pile up thickly upon it. The slow movement of the thickly piled up product through dead air chamber 35, permits part of the moisture left in the interior of the product to creep to its surface. There is substantially no motion of air in chamber 35.

After passing through dead-air chamber 35, the product is discharged into the final drying chamber 36, passing successively over conveyors 52, 53, 54, 55, 56 and 57, gradually becoming drier and drier until it has just the right amount of moisture content predetermined for it.

Blowers 24 send the air through openings in shelf 23 into flue 25 past sprinkler pipes 81 which extend substantially the length of the drier. After passing pipes 81 the air enters final drying chamber 36 through openings 26, leaving through openings 33 into lower air return chamber 39. Air leaves air return chamber 39 principally through lower openings 33 into the lower portion of final drying chamber 36 and out the lowest opening 26 to the under or suction side of blower 24 below shelf 23. As explained above for preliminary drying chamber 30, there is not a direct quick circulation of air, but all sorts of counter-currents past the product, the air having only a circulation in general, passing laterally through chamber 36. Air entering chamber 36 through an opening 26 passes inside a conveyer, finding its way out through the meshes of a conveyer and around the product upon it. In order to regulate the amount of fresh air taken into the circulation, vertically sliding doors 82 are provided at openings in wall 11, and vertically sliding doors 83 are provided at openings in wall 10 of air return chamber 39. Further to furnish heat to the air entering the system through doors 82, steam radiators 84 are provided at the openings at doors 82.

Instrument panel 85 of a wet and dry bulb control is located in flue 25 for controlling the moisture and temperature of the air in final drying chamber 36. Such control will not be described as it is well known to the art. By means of the control the amount of water discharged from sprinkler pipes 81 is regulated and the amount doors 82 and 83 are opened.

No moisture is added to the air circulating in preliminary drying chamber 30, but its content therein is controlled automatically by a wet bulb control (not shown) regulating the amount doors 79 and 80 are opened.

In earlier driers not having air return chambers, such as shown at 37 and 39, it was found that at the rear of the drying chambers, the air remained more or less dead, not subjecting the product to the proper drying action. The provision of the air return chambers ensures the proper motion and change of air at said rear. For short-cut macaroni it is desirable to have a cooling compartment for cooling the macaroni before it is discharged. This modification is shown in Fig. 3, where a partition 86 is provided above conveyer 57, giving rise to a cooling chamber 89. Openings 87 and 88 are provided in walls 11 and 10 respectively, leading directly to the open air. Blower 24 is raised to stand on partition 86, and door 82 is raised to come at an opening in wall 11 above said partition. Heater 84 is moved up accordingly. In this construction, the product leaves the final drying chamber 36 when it passes from conveyer 56.

I claim:

1. A dough product drier having walls forming a drying chamber, conveyers for carrying the product back and forth longitudinally through said chamber, said conveyers having their runs formed with openings to permit the circulation of air therethrough, a casing forming a flue communicating with openings provided in the front wall of said chamber, a blower in communication with said flue forcing the air generally into the upper portion of the chamber and withdrawing it from the lower portion, a casing forming an air return chamber communicating with openings provided in the rear wall of the drying chamber, said openings being in the front and rear walls only opposite the space between the upper and lower runs of each conveyer, whereby the air is circulated from the flue into the drying chamber, generally transversely across the drying chamber into the air return chamber and from thence back across the drying chamber into the flue, means for heating the circulating air and means for controlling the introduction of fresh air into said circulating air.

2. A dough product drier having walls forming an upper preliminary drying chamber, an intermediate sweat chamber and a lower final drying chamber, some of said walls forming transverse partitions between the sweat chamber and the drying chambers, substantially isolating the chambers from each other, conveyers for carrying the product successively through said chambers, the conveyers for the final drying chamber having their runs formed with openings to permit circulation of air therethrough, means for forcing a draft of air through the upper chamber from one side and exhausting it also from said side, other means for forcing a draft of air through the lower chamber from one side and exhausting it also from said latter side, the draft forcing means for the upper and lower chambers being substantially out of communication with each other and with the sweat chamber, a casing forming an air return chamber in communication with the upper chamber on the opposite side from which it receives the air, another casing forming an air return chamber for the lower chamber also on the opposite side from which the latter receives the air, said air return chambers being substantially out of communication with each other and with the sweat chamber, said air return chambers receiving the air from their respective drying chambers and permitting it to return to be exhausted from them, means for controlling the introduction of fresh air into said drafts, and means for heating the draft through the lower chamber.

3. A dough product drier having walls including front and rear side walls and intermediate walls extending substantially between the sidewalls, said walls forming an upper preliminary drying chamber, an intermediate sweat chamber and a lower final drying chamber, the intermediate walls forming partitions between the sweat chamber and the drying chambers, substantially isolating the latter from each other and the sweat chamber, conveyers for carrying the product successively through said chambers, the conveyers for the final drying chamber having their runs formed with openings to permit circulation of air therethrough, the front and rear sidewalls of the drier being substantially parallel to the directions of travel of the conveyers, the front and rear side walls at the drying chambers having openings therein for the passage of air therethrough, a casing forming a flue communicating with the openings in one of said side walls at the upper chamber, means in communication with said flue for forcing a draft of air into the upper chamber through said latter openings and out the openings in the other side wall at the upper chamber, and a casing forming an air return flue in communication with the openings in said other side wall at the upper chamber and with the exhaust of the draft forcing means, another casing forming a flue substantially out of communication with said former flues but communicating with the openings in one of said side walls at the lower chamber, means in communication with said last flue for forcing a draft of air into the lower chamber through said last openings and out the openings in the other of said side walls at the lower chamber, and another casing forming an air return flue in communication with the openings in the other side wall at the lower chamber and with the inlet of the draft forcing means for the lower chamber, said latter air return flue being substantially out of communication with the flues of the upper chamber, means for controlling the introduction of fresh air into said drafts, and means for heating the draft through the lower chamber.

CARMINE SURICO.